(12) United States Patent
Serizawa et al.

(10) Patent No.: US 7,759,891 B2
(45) Date of Patent: Jul. 20, 2010

(54) APPARATUS AND METHOD FOR DETECTING ABNORMAL CONDITIONS OF A MOTOR

(75) Inventors: Akira Serizawa, Shizuoka (JP); Byungeok Seo, Shizuoka (JP)

(73) Assignee: Yazaki Corporation, Tokyo (JP)

(*) Notice: Subject to any disclaimer, the term of this patent is extended or adjusted under 35 U.S.C. 154(b) by 397 days.

(21) Appl. No.: 11/882,378

(22) Filed: Aug. 1, 2007

(65) Prior Publication Data
US 2008/0055799 A1 Mar. 6, 2008

(30) Foreign Application Priority Data
Aug. 31, 2006 (JP) .............................. 2006-234987

(51) Int. Cl.
H02H 7/08 (2006.01)
H02H 5/04 (2006.01)

(52) U.S. Cl. .................. 318/434; 318/472; 388/934; 361/25

(58) Field of Classification Search ......... 318/430–434, 318/471–473; 388/934; 361/23–34
See application file for complete search history.

(56) References Cited

U.S. PATENT DOCUMENTS

| | | | | |
|---|---|---|---|---|
| 3,775,655 A | * | 11/1973 | Du Vall | 318/634 |
| 4,705,412 A | * | 11/1987 | Matsumoto | 400/54 |
| 5,680,025 A | * | 10/1997 | Bowers et al. | 318/806 |
| 5,952,803 A | * | 9/1999 | Canada et al. | 318/558 |
| 6,294,888 B1 | * | 9/2001 | Becker | 318/471 |
| 6,392,376 B1 | * | 5/2002 | Kobayashi et al. | 318/471 |
| 6,980,881 B2 | * | 12/2005 | Greenwood et al. | 700/193 |
| 7,042,180 B2 | * | 5/2006 | Terry et al. | 318/400.21 |
| 7,053,603 B2 | * | 5/2006 | Swart | 324/207.18 |

FOREIGN PATENT DOCUMENTS

| | | |
|---|---|---|
| DE | 41 29 086 | 10/1992 |
| DE | 196 30 036 | 1/1998 |
| DE | 100 48 704 | 5/2002 |
| JP | 10-8959 | 1/1998 |
| JP | 2001-298988 | 10/2001 |

OTHER PUBLICATIONS

Correspondence from German Patent Office mailed Mar. 25, 2009 (4 pages).

* cited by examiner

*Primary Examiner*—Bentsu Ro
(74) *Attorney, Agent, or Firm*—Kratz, Quintos & Hanson, LLP

(57) ABSTRACT

The present invention provides an apparatus and a method for accurately detecting abnormal conditions of a motor. A $\Delta Tc/Tj$ detector detects a difference ($\Delta Tc$) between an environment temperature and a temperature of a field-effect transistor (FET) which turns on and off electric power supplied to a DC motor. A diagnosis control unit detects abnormal conditions such as a motor lock and a short circuit of the DC motor based upon the obtained difference. When the motor lock has been detected, the diagnosis control unit controls a pulse width modulation (PWM) control unit and a PWM oscillator (PW-MOSC) and makes a frequency and duty cycle of a PWM signal lower. When the short circuit has been detected, the diagnosis control unit controls a gate driver and turns off the FET.

14 Claims, 3 Drawing Sheets

APPARATUS AND METHOD FOR DETECTING ABNORMAL CONDITIONS OF A MOTOR

The priority application Number Japan Patent Application 2006-234987 upon which this patent application is based is hereby incorporated by reference.

BACKGROUND OF THE INVENTION (1) Field of the Invention

The present invention relates to an apparatus and a method for detecting abnormal conditions of a motor.

(2) Description of the Related Art

Conventional motors are used as drive sources for, for example, cooling fans and fuel pumps mounted on motor vehicles. Some devices for driving these motors have a switch device such as a field-effect transistor (FET) which is provided on a current path from a power source to the motor. This switch device allows stepless speed control of a rotational speed of the motor by changing a duty cycle of power supply voltage provided to the motor.

However, motor windings and switch devices of such conventional motors may be thermally destructed when a motor lock or a short circuit occurs and as a result, overcurrent continuously flows. To avoid such overcurrent caused by the motor lock or the short circuit, various methods for detecting abnormal conditions are in use. For example, the motor driving apparatuses as disclosed in the cited documents 1 (Japanese Unexamined Patent Application Publication No. 2001-298988) and 2 (Japanese Unexamined Patent Application Publication No. H10-8959) detect an occurrence of the abnormal condition when a current flowing through the motor exceeds a predetermined threshold value. Some of known methods for detecting abnormal conditions detect the abnormal conditions based upon a value of a voltage between a drain terminal and a source terminal of a field-effect transistor provided as the switch device, for this voltage corresponding to the value of the current flowing through the motor.

Methods for detecting abnormal conditions based upon the current flowing through the motor as mentioned above, however, fail to detect the abnormal condition in a case of an interlayer short circuit, where intermittent flow of overcurrent occurs during a short period of time. Since such momentary overcurrent as in the interlayer short circuit is hardly detected and therefore the interlayer short circuit is left undetectable as an abnormal condition. Also, since a value of the overcurrent in the interlayer short circuit is smaller than that in a case of a dead short circuit, the overcurrent caused by the interlayer short circuit in some cases may not exceed a predetermined threshold. Nevertheless, intermittent overcurrent resulting from the interlayer short circuit can cause gradual rise in a temperature of the switch device and, consequently, thermal destruction of the switch device may result.

In addition, the methods for detecting abnormal conditions based upon the current flowing through the motor as mentioned above fail to detect the abnormal conditions accurately when heat radiation efficiency of the switch device is degraded across the ages. This denotes that the heat radiation efficiency degraded across the ages could trigger the thermal destruction with the current flowing through the motor which would not otherwise cause the thermal destruction.

SUMMARY OF THE INVENTION

A primary object of the present invention, therefore, is to provide an apparatus and a method for detecting abnormal conditions of a motor, capable of accurately detecting the abnormal conditions of the motor, focusing on the drawbacks discussed above.

According to a first aspect of the present invention, an apparatus for detecting abnormal conditions of a motor includes a switch device for turning on and off electric power supplied to the motor, a switch temperature sensor for detecting a temperature of the switch device, an environment temperature sensor for detecting an environment temperature, and a motor abnormal condition detecting device for detecting abnormal conditions based upon a difference between the temperature of the switch device and the environment temperature.

Thereby, since the motor abnormal condition detector detects the abnormal condition of the motor based upon the difference between the temperature of the switch device and the environment temperature, the abnormal condition can be detected and thermal destruction of the motor can be avoided even when an interlayer short circuit occurs or when the heat radiation efficiency of the switch device is degraded across the ages.

According to a second aspect of the present invention, the apparatus for detecting abnormal conditions of the motor as mentioned above further includes an overcurrent detector for detecting overcurrent equal to or larger than a predetermined value flowing through the switch device, wherein the switch device has a semiconductor switch which is turned on when the switch device applies drive voltage between a gate terminal and a source terminal of the switch device, and wherein a current flowing through the switch device is limited by lowering the drive voltage flowing through the gate terminal and the source terminal of the switch device when the overcurrent is detected by the overcurrent detector.

According to a second aspect of the present invention, the overcurrent detector detects that overcurrent to be defined by that an electric current flowing through the switch device becomes equal to or larger than a predetermined value flows through the switch device. Upon detection of the overcurrent, the drive voltage supplied on gate-to-source of the switch device is lowered and the current flowing through the switch device is limited. Accordingly, when the switch device is turned on, inrush current occurs, and overcurrent equal to or larger than the predetermined value flows through the switching device, then the current flowing through the switch device is limited. With respect to the inrush current, after an inrush current period, the current flowing through the switch device decreases and the overcurrent detector no more detects the overcurrent, the current limitation is exited, and the switch device is again driven by a drive voltage in a normal state. Thus, the current supplied to the motor is not interrupted due to the inrush current.

According to a third aspect of the present invention, the apparatus for detecting abnormal conditions of the motor has the switch device and the switch temperature sensor, both of which are disposed on one chip.

Thereby, the switch device and the switch temperature sensor are both disposed on the one chip. This configuration achieves accurate detection of the temperature of the switch device.

According to a fourth aspect of the present invention, the apparatus for detecting the abnormal condition of the motor as mentioned above has the motor abnormal condition detector which detects a first abnormal condition as a motor lock when the difference between the temperature of the switch device and the environment temperature exceeds a first threshold predetermined with respect to the difference detected in the case of the motor lock and likewise detects a second abnormal condition as a short circuit when the above-mentioned difference exceeds a second threshold predetermined with respect to the difference detected in the case of the short circuit.

Thereby, the occurrence of the motor lock is detected when the difference between the temperature of the switch device and the environment temperature exceeds the first threshold while the occurrence of the short circuit is detected when the above difference exceeds the second threshold. This allows the motor lock and the short circuit to be detected as two distinctly different phenomena.

According to a fifth aspect of the present invention, the apparatus for detecting the abnormal condition of the motor as mentioned above also has a switch control device for lowering power supplied to the motor by controlling the switch device when the motor lock is detected.

Thereby, the switch device, when the motor lock is detected, is placed under control by the switch control device in order to reduce voltage supplied to the motor. This allows electric power to be kept supplied to the motor in a case of a temporary motor lock so that the switch device can be protected against thermal destruction.

According to a sixth aspect of the present invention, the apparatus for detecting abnormal conditions of the motor, as mentioned above also has an interrupt device for stopping electric power supplied to the motor by turning off the switch device when the short circuit is detected.

Thereby, the interrupt device stops electric power supplied to the motor by turning off the switch device when the occurrence of the short circuit is detected. This allows electric power to be stopped before thermal destruction of the switch device results.

According to the first aspect of the present invention as described above, the abnormal condition can be detected with accuracy even when the interlayer short circuit occurs or when heat radiation efficiency of the switch device is degraded across the ages. Also, since the abnormal condition of the motor is detected based upon the difference between the temperature of the switch device and the environment temperature, such the abnormal condition as cannot be detected solely by the current flowing through the switch device is also detectable. This allows the abnormal condition to be accurately detected.

According to the second aspect of the present invention, when the switch device is turned on, the inrush current flows, and the overcurrent equal to or larger than a predetermined value flows through the switch device, then the current flowing through the switch device is limited as required. With respect to the inrush current, the current flowing through the switch device decreases after the inrush current period. Also, the overcurrent detector no more detects the overcurrent, the current limitation is exited, and the switch device is again driven by the drive voltage in the normal state. Since the current supplied to the motor is not stopped due to the inrush current, detection of the inrush current mistakenly treated as a short circuit can be effectively eliminated, thus ensuring more accurate detection of the abnormal conditions of the motor.

According to the third aspect of the present invention, the temperature of the switch device can be detected with accuracy, which allows the abnormal conditions to be detected more accurately.

According to the fourth aspect of the present invention, the motor lock and the short circuit can be detected as two distinctly different phenomena. This makes detection of the abnormal conditions more accurate.

According to the fifth aspect of the present invention, when the temporary overcurrent occurs due to the motor lock, it can be maintained that the power is supplied to the motor while ensuring that thermal destruction of the switch device is avoided. This allows the switch device to be securely protected against thermal destruction.

According to the sixth aspect of the present invention, the power supply can be interrupted before thermal destruction of the switch device happens and therefore the switch device can be securely protected against thermal destruction.

The above and other objects and features of this invention will become more apparent from the following description taken in conjunction with the accompanying drawings.

DESCRIPTION OF THE PREFERRED EMBODIMENT

Figure 1:
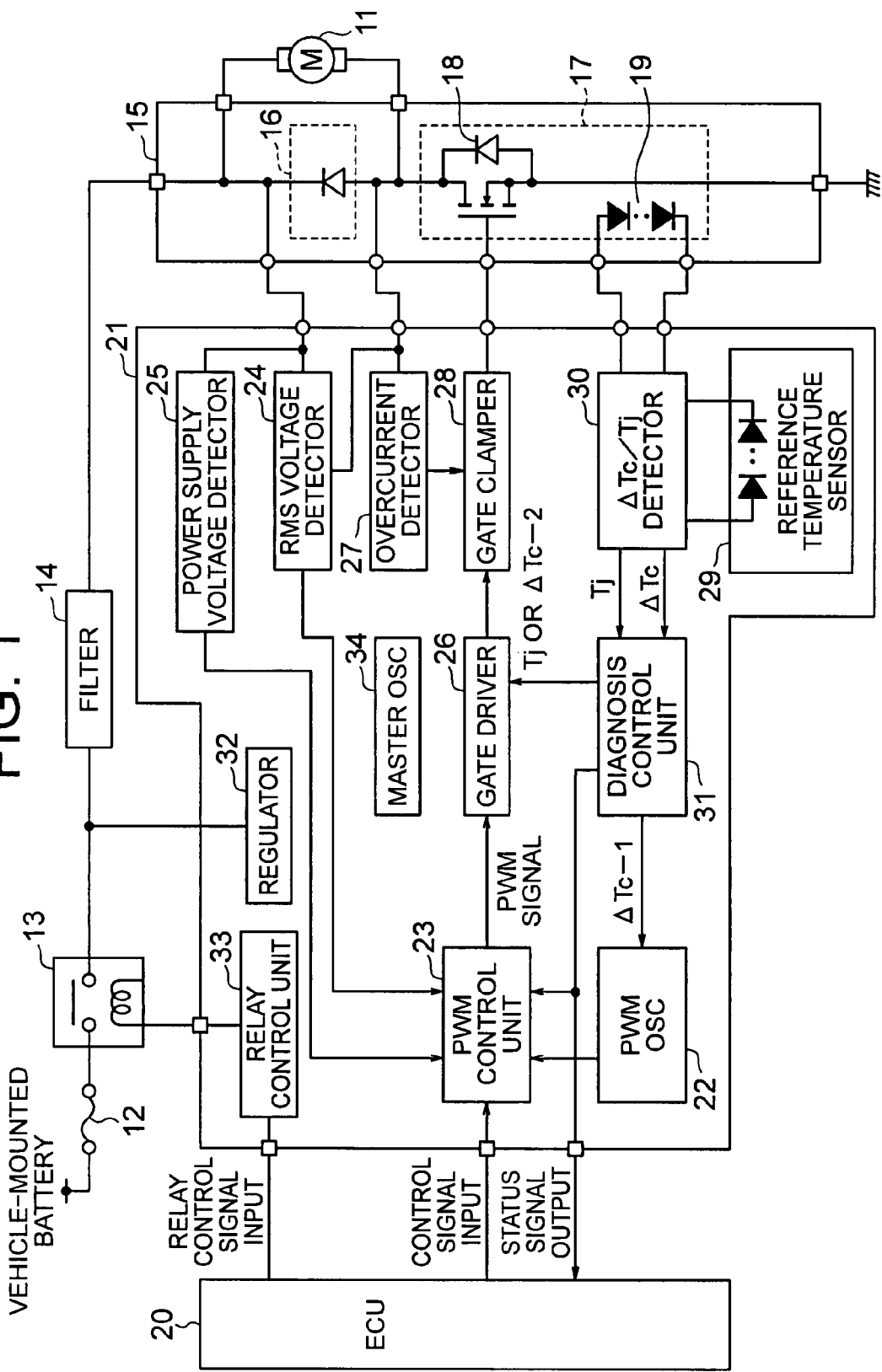
FIG. 1 is a block diagram showing an embodiment of a motor driving apparatus incorporating an apparatus for detecting abnormal conditions of a motor according to the present invention.

In the following, one embodiment of the present invention is explained with reference to the attached drawings. FIG. 1 is a block diagram of an embodiment of a motor apparatus which includes an apparatus for detecting abnormal conditions of a motor according to the present invention. As shown in FIG. 1, the motor apparatus has a DC motor 11. The DC motor 11 is a motor which drives, by way of non-limiting examples, a cooling fan and a fuel pump mounted on an automobile. Electric power is supplied from a vehicle-mounted battery to the DC motor 11 via a fuse 12, an electric relay 13, and a filter 14.

The motor apparatus also includes an FET module 15. The FET module 15 incorporates a flywheel diode 16 and a one-chip-type FET 17. The one-chip-type FET 17 incorporates a field-effect transistor 18 (hereafter simply called "FET 18") functioning as a switch device, and a switch temperature sensor 19 on one chip.

The flywheel diode 16 is connected in parallel with the DC motor 11. The FET 18 is connected in series with the DC motor 11 and turns on and off electric power supplied to the DC motor 11. The switch temperature sensor 19 has diodes connected in series with each other and detects a temperature of the FET 17.

The motor apparatus also has an electronic control unit (ECU) 20 and a motor controller 21. The ECU 20 generates a control input signal supplied to the motor controller 21 in accordance, as non-limiting examples, with air capacity of the cooling fan determined based upon a temperature of a coolant and with an amount of fuel injected by a fuel pump determined based upon accelerator pedal operation. The motor controller 21 has a pulse width modulation oscillator (hereafter simply called "PWMOSC") 22 and a pulse width modulation (PWM) control unit 23.

The PWMOSC 22 is an oscillator for generating, for example, a triangular wave at a constant frequency for a pulse-width-modulated (PWM) signal. The PWM control unit 23 includes a comparator (not shown) for comparing the above triangular wave with a predetermined threshold and a control unit (not shown) for controlling a duty cycle of the PWM signal by controlling a threshold.

The motor controller 21 also has a root-mean-square (rms) voltage detector 24 and a power supply voltage detector 25. A voltage across the DC motor 11 is supplied to the rms voltage detector 24. The rms voltage detector 24 obtains a root-mean-square (rms) value of the voltage across the DC motor 11 based upon a voltage across the flywheel diode and then supplies the obtained rms value to the PWM control unit 23.

The voltage of the flywheel diode 16 at the side of the vehicle-mounted battery is supplied to the power supply voltage detector 25. The power supply voltage detector 25 determines a power supply voltage based upon the voltage of the flywheel diode 16 at the side of the vehicle-mounted battery and the determined power supply voltage is then supplied to the PWM control unit 23.

The PWM control unit 23 outputs the PWM signal with a duty cycle under which the rms value provided by the RMS voltage detector 24 corresponds to a control signal input. In addition, the PWM control unit 23 monitors the power supply voltage delivered via the power supply voltage detector 25 and outputs the PWM signal for which variation in power supply voltage has been corrected.

The PWM signal output by the PWM control unit 23 is delivered to a gate driver 26. The gate driver 26 provides a gate of the FET 18 with pulsed gate drive voltage having a same waveform as the PWM signal. When the gate drive voltage is applied, the FET 18 conducts drain-to-source, allowing electric power to be delivered from the vehicle-mounted battery to the DC motor 11.

The motor apparatus has an overcurrent detector 27 and a gate clamper 28. A drain voltage (i.e., drain-to-source voltage) of the FET 18 is applied to the overcurrent detector 27. The overcurrent detector 27 functions as an overcurrent detector of this invention and, when the drain-to-source voltage exceeds a threshold for judging occurrence of a short circuit, judges that an overcurrent larger than a predetermined value is flowing through the FET 18. When the overcurrent detector 27 judges that the drain-to-source voltage is larger than the threshold for judging occurrence of a short circuit, which indicates that an overcurrent is flowing, this information is sent by the overcurrent detector 27 to the gate clamper 28.

The gate clamper 28 is disposed between the gate driver 26 and the gate terminal of the FET 18. As a non-limiting example, the gate clamper 28, when the overcurrent detector 27 detects an overcurrent, connects a zener diode between the source terminal and the gate terminal of the FET 18 and the gate drive voltage is forcibly reduced to a value of a zener voltage. Thus, the gate drive voltage from the gate driver 26 is clamped to the zener voltage and current flowing through the FET 18 is as a result limited.

The motor apparatus also has a reference temperature sensor 29 (i.e., an environment temperature sensor), a $\Delta Tc/Tj$ detector 30, and a diagnosis control unit 31. The reference temperature sensor 29 has diodes series-connected with each other and detects an environment temperature (i.e., a reference temperature).

The temperature of the FET 18 detected by the switch temperature sensor 19 and the environment temperature detected by the reference temperature sensor 29 are sent to the $\Delta Tc/Tj$ detector 30. The $\Delta Tc/Tj$ detector 30 determines the difference ($\Delta T$) between the temperature of the FET 18 and the environment temperature, and then an obtained difference $\Delta T$ is delivered to the diagnosis control unit 31. The $\Delta Tc/Tj$ detector 30 supplies the temperature of the FET 18 as an absolute temperature ($Tj$) of the FET 18 to the diagnosis control unit 31.

The diagnosis control unit 31 functions as a motor abnormal condition detecting device and detects abnormal conditions of the DC motor 11 based upon a value of the difference ($\Delta Tc$). The diagnosis control unit 31 detects a first abnormal condition as a motor lock when the difference ($\Delta Tc$) exceeds a predetermined lock-detect threshold ($\Delta Tc-1$), i.e., a first threshold. The lock-detect threshold ($\Delta Tc-1$) is predetermined to be the difference ($\Delta Tc$) detected upon occurrence of the motor lock.

When the motor lock is detected, the diagnosis control unit 31 controls a frequency of the PWMOSC 22 so that the frequency of PWMOSC 22 is changed to a tenth of a frequency in a normal state. Also, the diagnosis control unit 31, when the motor lock is detected, outputs a status output signal indicative of the motor lock to the PWM control unit 23 and the ECU 20. When the status output signal indicative of the motor lock is input to the PWM control unit 23, the PWM control unit 23 lowers the duty cycle of the PWM signal. Thus, the PWM signal with a frequency equal to a tenth of the frequency in the normal state and with a low duty cycle is output from the PWM control unit 23.

In such a case where over temperature of the chip as a second abnormal condition is detected with a difference ($\Delta Tc$) larger than a second threshold, i.e., an over-temperature-detect threshold ($\Delta Tc-2$) which is higher than the lock-detect threshold ($\Delta Tc-1$), or where the absolute temperature ($Tj$) exceeds an over temperature threshold (150° C., for example), the diagnosis control unit 31 stops the gate drive voltage output on the gate driver 26. The over-temperature-detect threshold ($\Delta Tc-2$) is predetermined to be the difference ($\Delta Tc$) detected upon occurrence of a dead short circuit.

The motor apparatus has a regulator 32, an electric relay control unit 33, and a master OSC 34. The regulator 32 generates power supply voltage for the motor controller 21 based upon the supply voltage of the vehicle-mounted battery. The relay control unit 33, in response to a relay control signal input from the ECU 20, energizes the relay coil in the electric relay 13 and turns on a relay switch. Turning on the relay switch of the electric relay 13 allows electric power to be supplied to the DC motor 11. The master OSC 34 is an oscillator for generating a basic operation clock signal for the motor controller 21.

Figure 2:
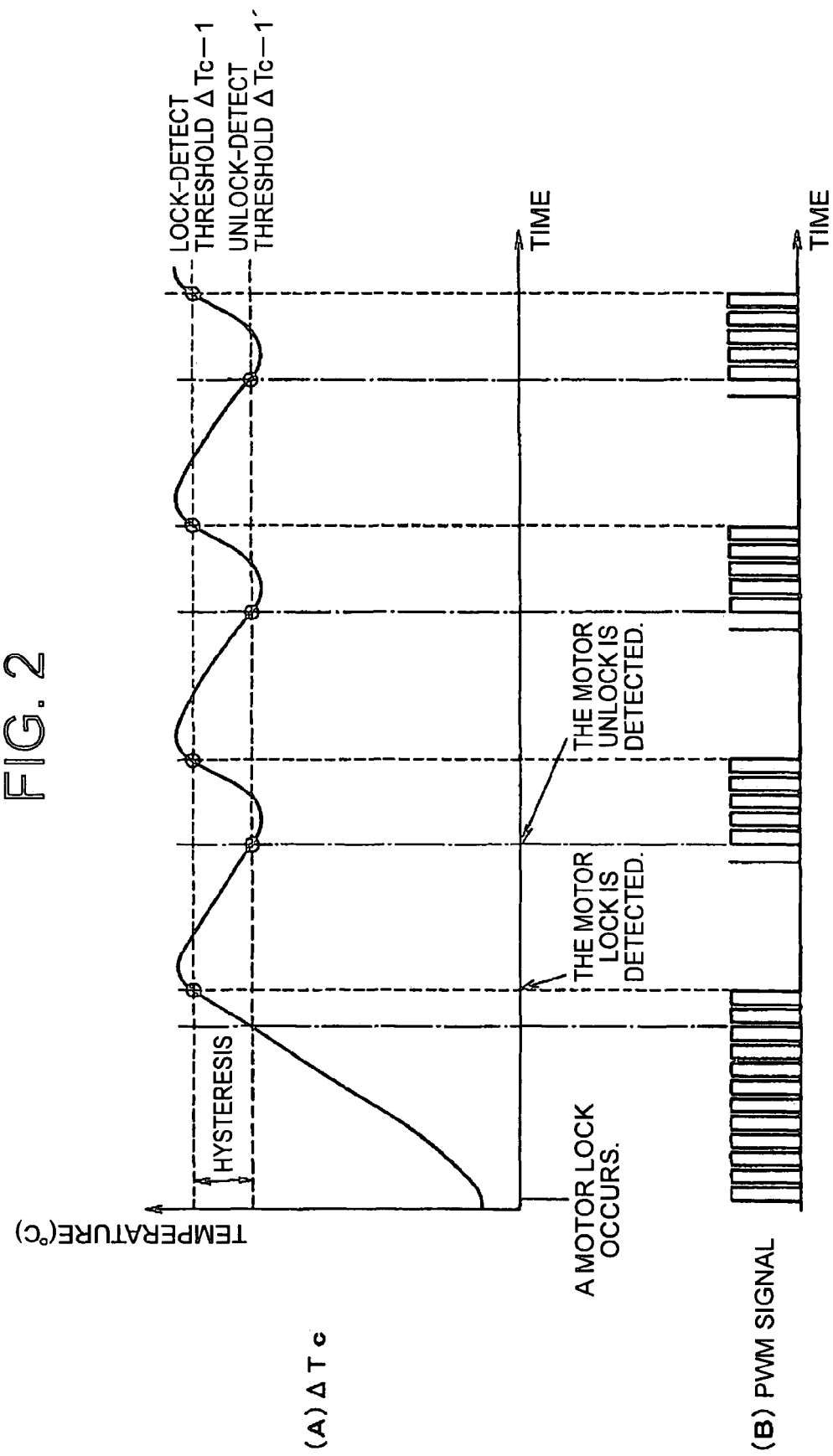
FIG. 2 is a timing chart in the case of the motor lock, where (A) and (B) indicate the difference ($\Delta Tc$) and the PWM signal, respectively.
Figure 3:
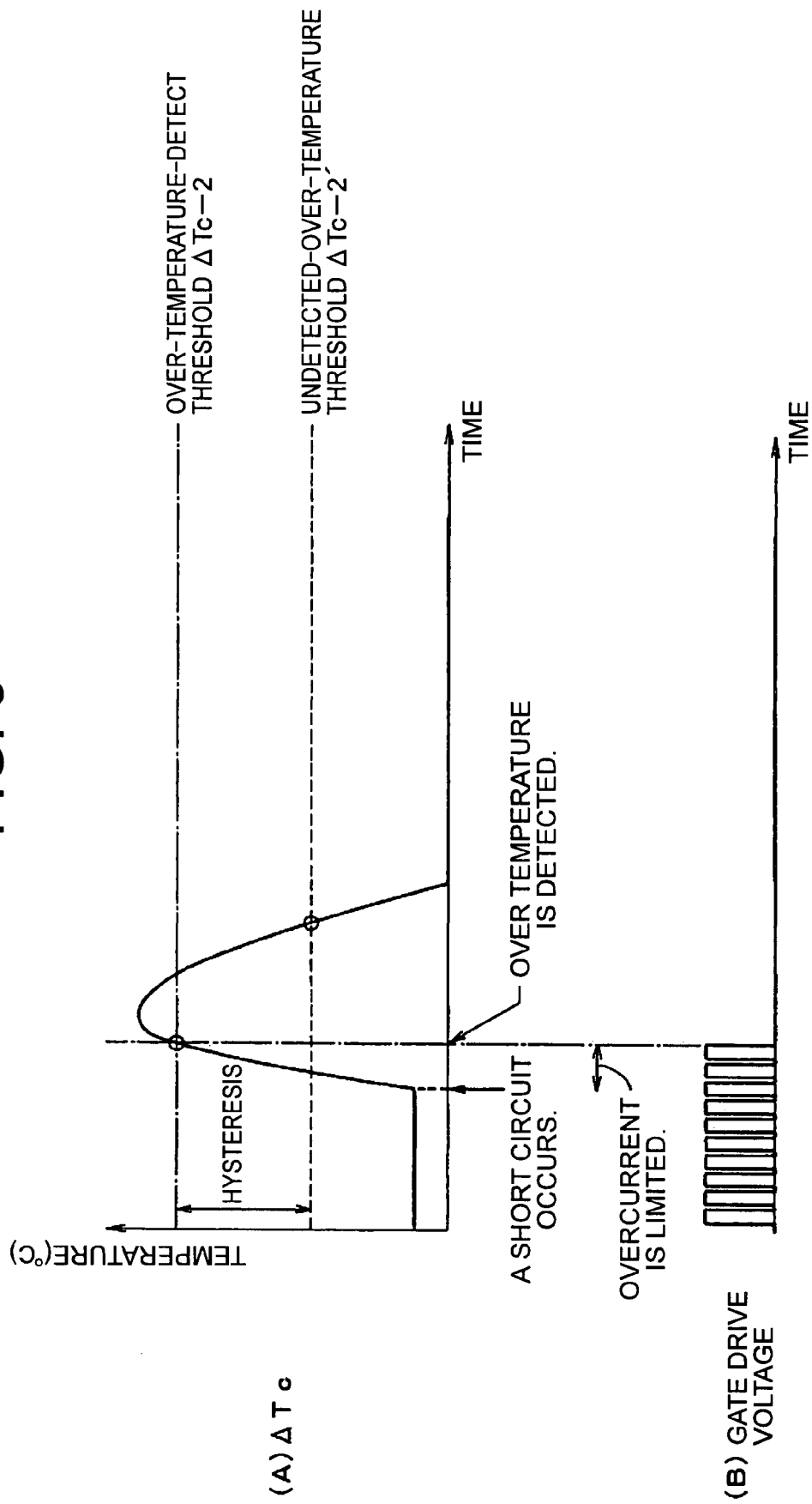
FIG. 3 is a timing chart in the case of the short circuit, where (A) and (B) indicate the difference ($\Delta Tc$) and the gate drive voltage, respectively.

Operation of a motor apparatus with a configuration as mentioned above is explained below with reference to the timing charts shown in FIGS. 2 and 3. (A) and (B) of FIG. 2 show the difference ($\Delta Tc$) and the PMW signal, respectively, in a case of the motor lock. (A) and (B) of FIG. 3 show the difference ($\Delta Tc$) and the gate drive voltage, respectively, in a case of the short circuit. To start with, the ECU 20 outputs a relay control input signal to the relay control unit 33 so that the power supply can be supplied to the DC motor 11. In the normal states, the PWM control unit 23 outputs the PWM signal with a duty cycle at which the rms value provided by the rms voltage detector 24 corresponds to the control signal input from the ECU 20.

When the motor lock occurs, overcurrent flows through the FET 18, causing the temperature of the FET 18 to rise. This, as shown by (A) of FIG. 2, makes the difference ($\Delta Tc$) between the temperature of the FET 18 and the environment temperature larger. When the difference ($\Delta Tc$) becomes larger than the lock-detect threshold ($\Delta Tc-1$), the diagnosis control unit 31 detects the motor lock and controls the frequency of the PWMOSC 22 so that the frequency of the PWMOSC 22 is changed to a tenth of the frequency in the normal state. Also, the diagnosis control unit 31 outputs a status output signal indicative of the motor lock to the PWM control unit 23 and ECU 20.

When the status output signal indicative of the motor lock is input to the PWM control unit 23, the PWM control unit 23 makes the duty cycle lower than in the normal states. Accordingly, as shown by (B) of FIG. 2, the PWM control unit 23 outputs the PWM signal with the frequency equal to one-tenth of the frequency in the normal state and with the lower duty cycle. This PWM signal output with lower frequency and lower duty cycle shortens a period of time where the FET 18 is turned on, resulting in lowered voltage applied to the DC motor 11. Now it is clear that the PWM control unit 23 and diagnosis control unit 31 act as a switch control device for stopping supply of the electric power supplied to the motor of this invention.

Lower electric power causes the temperature of the FET 18 to fall, and the difference ($\Delta Tc$) between the temperature of the FET 18 and the environment temperature becomes smaller. When the difference ($\Delta Tc$) becomes equal to or less than the unlock-detect threshold ($\Delta Tc-1'$), the diagnosis control unit 31 is taken out of a motor-lock-detect state and the signal output by the PWMOSC 22 regains the frequency in the normal state. The diagnosis control unit 31 then stops outputting the status output signal indicative of the motor lock to the PWM control unit 23 and ECU 20.

When the status output signal indicative of the motor lock is stopped, the PWM control unit 23 assigns a duty cycle in the normal state to the PWM signal. Thereafter, as shown by (B) of FIG. 2, the PWM signal in the normal state is output. When the motor lock still continues after the PWM signal again has the frequency and duty cycle in the normal state, the difference ($\Delta Tc$) exceeds the lock-detect threshold ($\Delta Tc-1$) and the diagnosis control unit 31 further detects the motor lock. After that, the PWM signal with a frequency equal to one-tenth of a frequency in a normal sate and with a low duty cycle and the PWM signal in the normal state are alternately output until the motor lock is exited. The operation described above indicates that the FET 18 does not operate with the difference between the temperature of the switch device and the environment temperature being larger than the lock-detect threshold.

Referring now to FIG. 3, when the dead short circuit occurs, the gate-to-source voltage of the FET 18 exceeds the threshold for judging occurrence of the short circuit, and the overcurrent detector 27 detects the occurrence of the short circuit, and activates the gate clamper 28, so as to clamp the gate voltage of the FET 18 to the zener voltage by means of, by way of a non-limiting example, the zener diode, and limit the current flowing through the FET 18. Since overcurrent larger than electric current of the motor lock continues to flow through the FET 18, the temperature of the FET 18 rises abruptly. This, as shown by (A) of FIG. 3, causes sharply increased difference ($\Delta Tc$) between the temperature of the FET 18 and the environment temperature. When the difference ($\Delta Tc$) becomes larger than the over-temperature-detect threshold ($\Delta Tc-2$), the diagnosis control unit 31 detects occurrence of over temperature in the chip and, acting as an interrupt device of this invention, stops the gate drive voltage output from the gate driver 26.

The FET 18 is turned off upon stoppage of outputting the gate drive voltage. This also causes power supply to the DC motor 11 to be stopped, resulting in stoppage of the current flowing through the FET 18. Stoppage of the current flowing through the FET 18 causes the temperature of the FET 18 to fall, resulting in decreased difference ($\Delta Tc$) between the temperature of the FET 18 and the environment temperature. The diagnosis control unit 31 retains stoppage of the gate drive voltage output until an ignition switch is turned off, even when the difference ($\Delta Tc$) diminishes and becomes equal to or less than the undetected-over-temperature threshold ($\Delta Tc-2'$) or the unlock-detect threshold ($\Delta Tc-1'$).

In addition, the diagnosis control unit 31 outputs a status output signal indicative of a short circuit to the PWM control unit 23 and ECU 20. The PWM control unit 23 stops outputting the PWM signal when the status output signal indicative of the short circuit is supplied.

In addition, as mentioned above, when the absolute temperature (Tj) of the FET 18 exceeds a threshold, stoppage of gate drive voltage output is retained by the diagnosis control unit 31 until the ignition switch is turned off.

The motor apparatus as described above detects the abnormal condition in the DC motor 11 based upon the difference ($\Delta Tc$) between the temperature of the FET 18 and the environment temperature, i.e. a temperature of the FET 18 obtained by compensating the environment temperature. This allows an abnormal condition in the DC motor 11 to be detected with accuracy without an effect of the environment temperature.

In the motor apparatus as described above, detection of the abnormal condition remains possible and thermal destruction of the FET 18 can be avoided even when an interlayer short circuit occurs or when the heat radiation efficiency of the FET 18 is degraded across the ages. The overcurrent detector 27 cannot detect occurrence of overcurrent in the case of the interlayer short circuit, where instantaneous or small overcurrent flows through the FET 18. Nevertheless, in response to a temperature rise of the FET 18 due to the interlayer short circuit, the diagnosis control unit 31 detects the increased difference ($\Delta Tc$), thus ensuring the integrity of the motor abnormal condition detection.

Also, in some cases the temperature of the FET 18 may rise due to flow of current not detectable as overcurrent by the overcurrent detector 27 on account of degraded heat radiation efficiency of the FET 18 by aging. Even in such cases, the diagnosis control unit 31 is capable of detecting the increased difference ($\Delta Tc$) resulting from the temperature rise of the FET 18, thus achieving successful motor abnormal condition detection.

The motor apparatus as described above has the FET 18 and switch temperature sensor 19 both disposed on one chip and is capable of detecting the temperature of the FET 18 with accuracy, achieving improved accuracy in abnormal condition detection for the DC motor 11.

The motor apparatus as described above detects the motor lock when the difference ($\Delta Tc$) between the temperature of the FET 18 and the environment temperature exceeds the lock-detect threshold ($\Delta Tc-1$) while it detects a short circuit when the difference ($\Delta Tc$) exceeds the over-temperature-detect threshold ($\Delta Tc-2$). Therefore, the motor apparatus as described above is capable of discriminating between the motor lock and short circuit, which allows accurate abnormal condition detection for the DC motor 11.

In the motor apparatus as described above, the diagnosis control unit 31 and PWM control unit 23, when the occurrence of the motor lock is detected, reduces electric power supplied to the DC motor 11 by outputting the PWM signal with lower frequency and duty cycle to the FET 18. Therefore, when temporary overcurrent occurs due to the motor lock, power can be kept supplied to the DC motor 11 in a manner that the FET 18 is securely protected against thermal destruction.

In the motor apparatus as described above, when the diagnosis control unit 31 detects the occurrence of a short circuit, gate drive voltage output from the gate driver 26 is stopped for turning off the FET 18 and the electric power supplied to the DC motor 11 is stopped. By cutting off electric power supplied to the DC motor 11, the DC motor 11 is securely protected against thermal destruction.

Although an FET is used as a switch device in the embodiment of the present invention as described above, this does not mean that an FET has to be exclusively used for the present invention. As a non-limiting example, any other switch device, such as a transistor, capable of turning on and off electric power supplied to the DC motor can also be used for the motor apparatus of the present invention.

Although diodes are employed as the switch temperature sensor 19 and reference temperature sensor 29 in the embodiment of the present invention as described above, this does not mean that the use of diodes is mandatory with respect to the present invention. As non-limiting examples, other devices capable of detecting a temperature, such as a thermopile and a resistance temperature detector (RTD), can also be used for the motor apparatus of the present invention.

In the embodiment as described above, the PWM control unit 23 and diagnosis control unit 31 control the PWM signal in such a manner that the PWM signal has a frequency equal to one-tenth of the frequency in the normal state and the low duty cycle upon detection of the motor lock. However, the present invention does not exclude other possibilities of embodiment. By way of a non-limiting example, one of other possible implementations will be stoppage of electric current supplied to the DC motor 11 by turning off the FET 18 in response to the difference ($\Delta Tc$) exceeding the lock-detect threshold ($\Delta Tc-1$), which should be held until the difference ($\Delta Tc$) becomes smaller than the unlock-detect threshold ($\Delta Tc-1'$).

It should be noted that the embodiment of the present invention as described above is only a typical one of the possible embodiments of the present invention and, therefore, the present invention is not confined to the embodiment that has been described in the foregoing paragraphs. Various changes and modifications can be made to the present invention insofar as the spirit and scope of the invention as set forth herein are not deviated from.

What is claimed is:

1. A method for detecting abnormal conditions of a motor, by comparing an environment temperature and a temperature of a switch device for turning on and off electric power supplied to said motor, comprising the steps of:
    detecting a temperature of said switch device by a temperature sensor, wherein said switch device and said temperature sensor are incorporated in a one-chip-type FET;
    detecting an environment temperature by an environment temperature sensor;
    determining a difference between the temperature of said switch device and the environment temperature; and
    detecting occurrence of a motor lock when the difference exceeds a lock-detect threshold, and detecting occurrence of a short circuit when the difference exceeds an over-temperature-detect threshold.

2. An apparatus for detecting abnormal conditions of a motor, comprising:
    a switch device for turning on and off electric power supplied to said motor;
    a switch temperature sensor for detecting a temperature of said switch device;
    an environment temperature sensor for detecting an environment temperature; and
    a motor abnormal condition detecting device for detecting the abnormal conditions of said motor based upon a difference between the temperature of said switch device and said environment temperature,
    wherein said motor abnormal condition detecting device detects a first abnormal condition as a motor lock when the difference between the temperature of said switch device and said environment temperature exceeds a first threshold determined to be said difference detected upon occurrence of the motor lock, and detects a second abnormal condition as a short circuit when said difference exceeds a second threshold determined to be said difference detected upon occurrence of the short circuit.

3. The apparatus as set forth in claim 2, further comprising a switch control device for reducing the electric power supplied to said motor by controlling said switch device upon detection of said motor lock.

4. The apparatus as set forth in claim 3, further comprising an interrupt device for stopping supply of the electric power supplied to said motor by turning off said switch device upon detection of said short circuit.

5. The apparatus as set forth in claim 2, further comprising an interrupt device for stopping supply of the electric power supplied to said motor by turning off said switch device upon detection of said short circuit.

6. An apparatus for detecting abnormal conditions of a motor, comprising:
    a switch device for turning on and off electric power supplied to said motor;
    a switch temperature sensor for detecting a temperature of said switch device;
    an environment temperature sensor for detecting an environment temperature;
    a motor abnormal condition detecting device for detecting the abnormal conditions of said motor based upon a difference between the temperature of said switch device and said environment temperature; and
    an overcurrent detector for detecting overcurrent to be defined by that an electric current flowing through said switch device becomes equal to or larger than a predetermined value, wherein
    said switch device has a semiconductor switch to be turned on by applying drive voltage between a gate terminal and a source terminal of said switch device,
    the electric current flowing through said switch device is limited by reducing the drive voltage applied between the gate terminal and the source terminal of said switch device upon detection of the overcurrent by said overcurrent detector, and
    said motor abnormal condition detecting device detects a first abnormal condition as a motor lock when the difference between the temperature of said switch device and said environment temperature exceeds a first threshold determined to be said difference detected upon occurrence of the motor lock, and detects a second abnormal condition as a short circuit when said difference exceeds a second threshold determined to be said difference detected upon occurrence of the short circuit.

7. The apparatus as set forth in claim 6, further comprising a switch control device for reducing the electric power supplied to said motor by controlling said switch device upon detection of said motor lock.

8. The apparatus as set forth in claim 6, further comprising an interrupt device for stopping supply of the electric power supplied to said motor by turning off said switch device upon detection of said short circuit.

9. An apparatus for detecting abnormal conditions of a motor, comprising:

a switch device for turning on and off electric power supplied to said motor;

a switch temperature sensor for detecting a temperature of said switch device;

an environment temperature sensor for detecting an environment temperature; and a motor abnormal condition detecting device for detecting the abnormal conditions of said motor based upon a difference between the temperature of said switch device and said environment temperature, wherein both of said switch device and said switch temperature sensor are disposed on one chip, and said motor abnormal condition detecting device detects a first abnormal condition as a motor lock when the difference between the temperature of said switch device and said environment temperature exceeds a first threshold determined to be said difference detected upon occurrence of the motor lock, and detects a second abnormal condition as a short circuit when said difference exceeds a second threshold determined to be said difference detected upon occurrence of the short circuit.

10. The apparatus as set forth in claim 9, further comprising a switch control device for reducing the electric power supplied to said motor by controlling said switch device upon detection of said motor lock.

11. The apparatus as set forth in claim 9, further comprising an interrupt device for stopping supply of the electric power supplied to said motor by turning off said switch device upon detection of said short circuit.

12. An apparatus for detecting abnormal conditions of a motor, comprising:

a switch device for turning on and off electric power supplied to said motor;

a switch temperature sensor for detecting a temperature of said switch device;

an environment temperature sensor for detecting an environment temperature; and a motor abnormal condition detecting device for detecting the abnormal conditions of said motor based upon a difference between the temperature of said switch device and said environment temperature;

an overcurrent detector for detecting overcurrent to be defined by that an electric current flowing through said switch device becomes equal to or larger than a predetermined value, wherein said switch device has a semiconductor switch to be turned on by applying drive voltage between a gate terminal and a source terminal of said switch device, the electric current flowing through said switch device is limited by reducing the drive voltage applied between the gate terminal and the source terminal of said switch device upon detection of the overcurrent by said overcurrent detector, both of said switch device and said switch temperature sensor are disposed on one chip, and said motor abnormal condition detecting device detects a first abnormal condition as a motor lock when the difference between the temperature of said switch device and said environment temperature exceeds a first threshold determined to be said difference detected upon occurrence of the motor lock, and detects a second abnormal condition as a short circuit when said difference exceeds a second threshold determined to be said difference detected upon occurrence of the short circuit.

13. The apparatus as set forth in claim 12, further comprising a switch control device for reducing the electric power supplied to said motor by controlling said switch device upon detection of said motor lock.

14. The apparatus as set forth in claim 12, further comprising an interrupt device for stopping supply of the electric power supplied to said motor by turning off said switch device upon detection of said short circuit.

* * * * *